J. B. CAPEWELL.
GLASS CASTER WHEEL.

No. 50,795. Patented Nov. 7, 1865.

Witnesses:
Wm. F. Brown
F. A. Follett

Inventor:
John B. Capewell,
By his Atty,
J. S. Brown.

UNITED STATES PATENT OFFICE.

JOHN B. CAPEWELL, OF GLOUCESTER, NEW JERSEY.

IMPROVED GLASS CASTER-WHEEL.

Specification forming part of Letters Patent No. 50,795, dated November 7, 1865.

*To all whom it may concern:*

Be it known that I, JOHN B. CAPEWELL, of Gloucester, in the county of Camden and State of New Jersey, have invented an Improved Glass-Wheel Caster; and I do hereby declare that the following is a full and exact description thereof, reference being had to the accompanying drawings, making a part of this specification—

Figure 1:
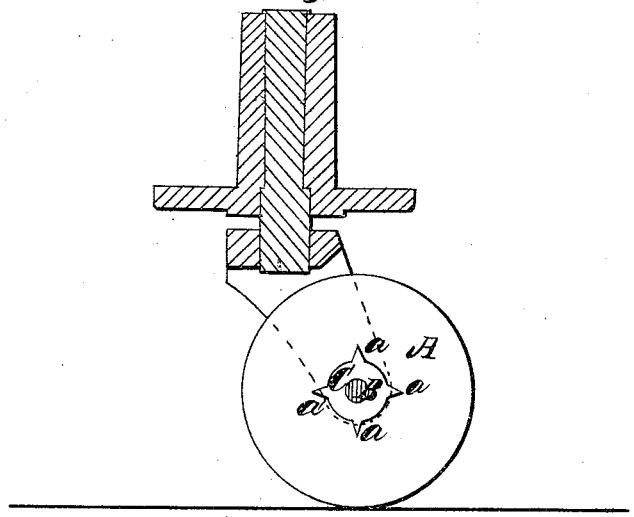
Figure 2:

Figure 1 being a central vertical section of a caster provided with my improvement; Fig. 2, a side view of the ribbed bush employed in the construction of the glass caster-wheel.

Like letters designate corresponding parts in both figures.

Casters with glass wheels are desirable for bedsteads, sofas, lounges, and other articles of furniture of a similar character, because of the insulation of the article thereby, thus not only securing the occupants from lightning, but conducing to the health of invalids. They are also especially valuable for piano fortes and other movable musical instruments intended to stand upon carpeted floors, because from the exceeding elasticity and sonorousness of glass the tones of the instruments are thus rendered much fuller and clearer; but there is much difficulty in the adaptation of glass to this purpose. The glass wheels, if they have no metallic bushing, will soon crumble and break to pieces, and an ordinary bush of metal very soon works loose in the glass, and hence the same result follows as without, though not quite so soon, since the bearing is thereby somewhat enlarged.

My improvement consists in employing a bush of metal, provided with longitudinal ribs projecting from its peripheral surface, around which the glass fits, so that there is no possibility of the bush's turning or working loose in the glass, and by thus enlarging the bearings the glass is found sufficiently strong and firm to resist abrasion and crumbling.

In the accompanying drawings, the metallic bush C is shown with its wedge-shaped ribs $a$ $a$ $a$ $a$, of any convenient number, fitting into similar-shaped notches in the glass wheel A. The bush turns on the pivot-pin B, thus relieving the glass of direct contact therewith.

In constructing these caster-wheels the bushes are first prepared, and the glass, when melted, is pressed around them in molds, so that when cold the wheels fit tightly upon the bushes. The bushes may have rivet-like heads on their ends, if desired.

What I claim as my invention, and desire to secure by Letters Patent, is—

The employment of glass wheels with ribbed bushes for casters, substantially as and for the purposes herein specified.

JOHN B. CAPEWELL.

Witnesses:
FRANCIS D. PASTORIUS,
W. W. DOUGHERTY.